Feb. 2, 1965  L. F. BUCHANAN  3,168,083
INTERNAL COMBUSTION ENGINE EXHAUST VALVE ASSEMBLY
Filed Oct. 22, 1962  4 Sheets-Sheet 1

INVENTOR.
Lucian F. Buchanan
BY
ATTORNEYS

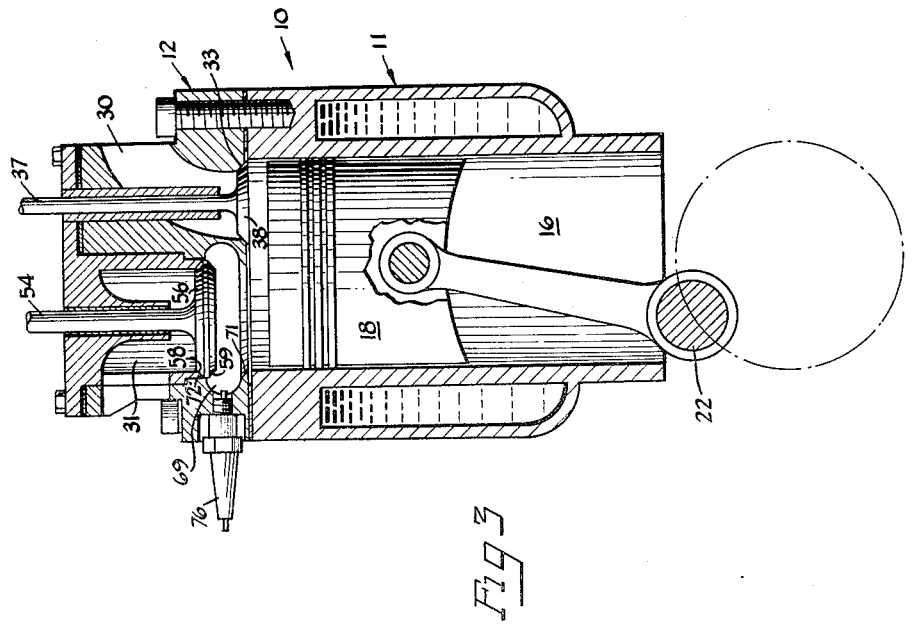
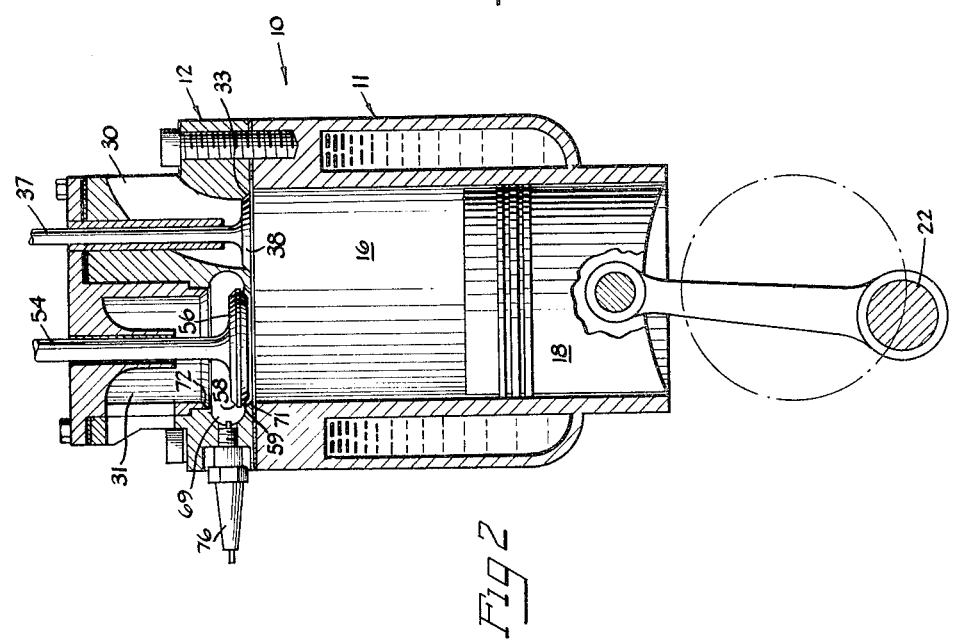

Feb. 2, 1965  L. F. BUCHANAN  3,168,083
INTERNAL COMBUSTION ENGINE EXHAUST VALVE ASSEMBLY
Filed Oct. 22, 1962  4 Sheets-Sheet 3
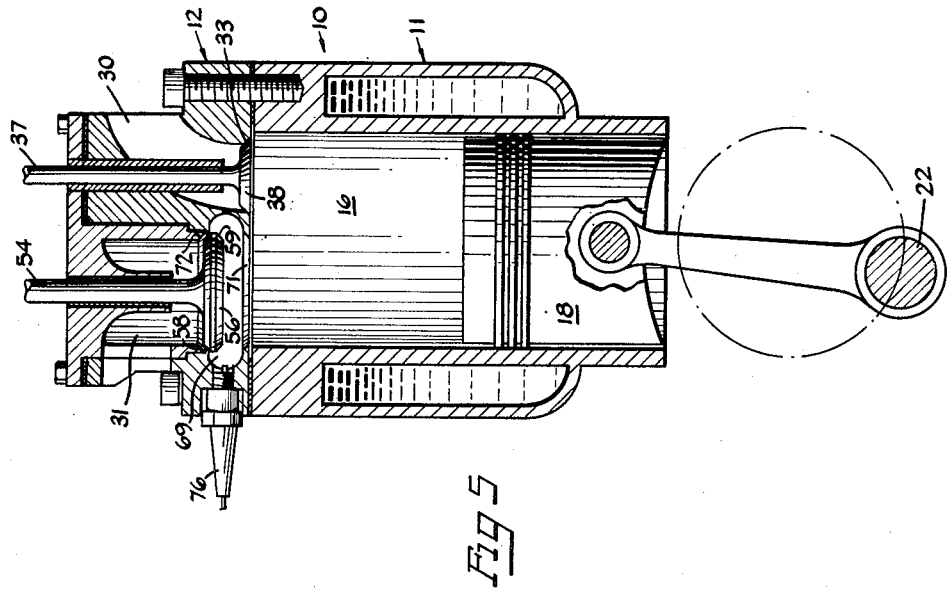
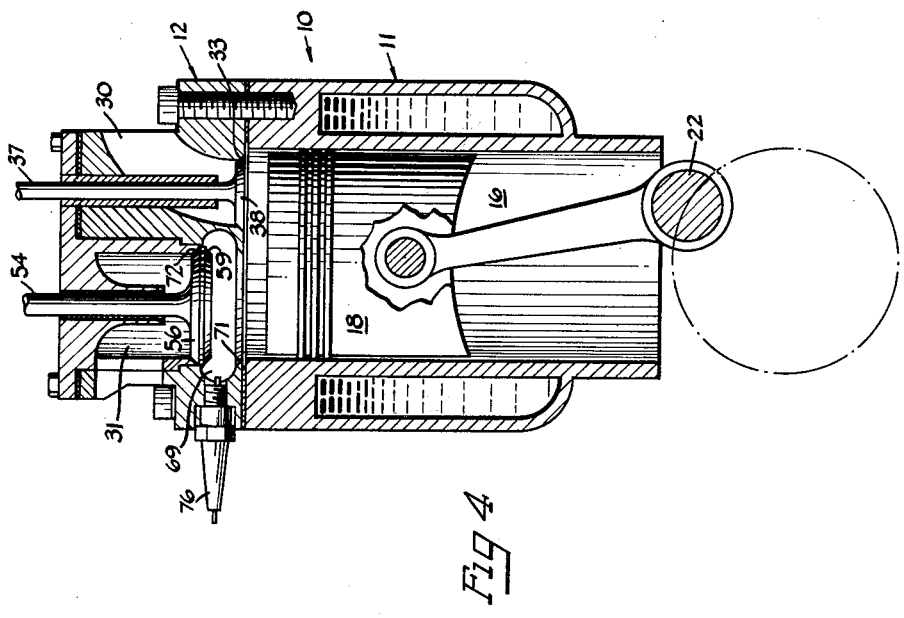
INVENTOR.
Lucian F. Buchanan
BY
ATTORNEYS

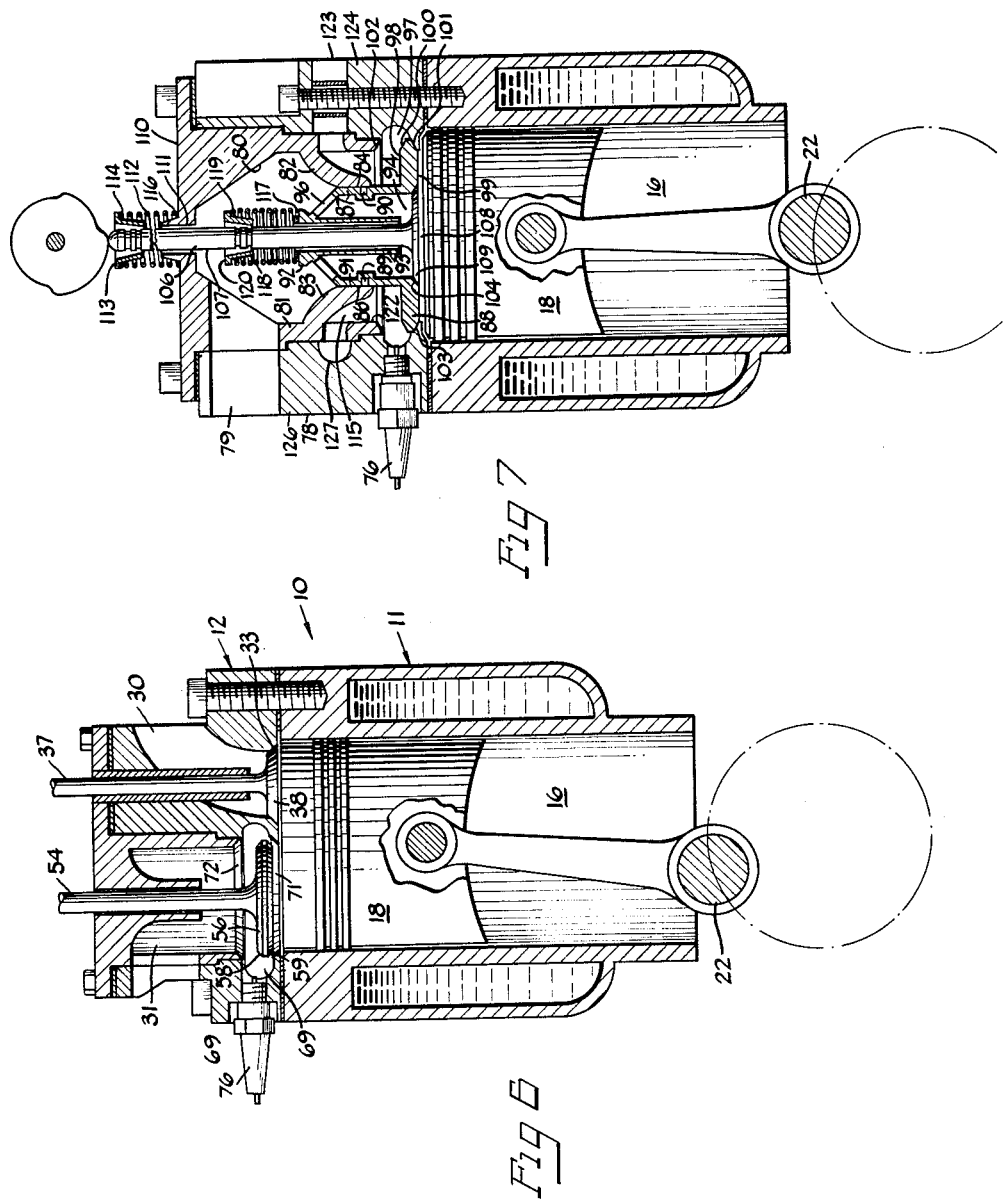

3,168,083
INTERNAL COMBUSTION ENGINE EXHAUST VALVE ASSEMBLY
Lucian F. Buchanan, R.F.D. 1, Box 395, Metropolis, Ill.
Filed Oct. 22, 1962, Ser. No. 231,941
15 Claims. (Cl. 123—84)

This invention relates to internal combustion engines and more particularly to internal combustion engines of the reciprocating type having poppet-type valves.

The invention is particularly directed to the construction and operation of the valves of the engine and it is the general object of the invention to provide a valve assembly whereby a combustion chamber is formed in the engine head intermediate the cylinder and the exhaust passageway with the head of the exhaust valve slidably carried within the combustion chamber and adapted to alternately isolate the combustion chamber from the cylinder and thereafter the combustion chamber from the exhaust passageway. This arrangement provides for almost complete purging of the cylinders during the exhaust stroke of the pistons, immediate intake of fuel charge into the cylinders as soon as the piston begins its intake stroke and a larger than normal effective volume of the cylinder during the compression and power strokes, thereby effectively reducing the ratio of compression.

It is well known that in the operation of conventional poppet-type valves in internal combustion engines certain undesirable and inefficient effects have been prevalent. In most engines of this construction, the intake valve and the exhaust valve of a cylinder open by extending the valve heads into the cylinder. Thus, when the piston is moving from bottom dead center to top dead center in an exhaust stroke, the exhaust valve head cannot remain open to protrude into the cylinder as the piston closely approaches the top of the cylinder. Therefore, when the exhaust valve closes, there continues to remain in the cylinder a relatively substantial amount of spent gases which have not been purged. As the piston descends on the intake stroke, any spent gas pressure built up in the cylinder must be reduced to a pressure equal to or less than the pressure of the fuel charge before the intake valve can open in order to preclude passing of spent gases into the intake valve port. The intake valve must remain closed, therefore, during a greater period of time than would be required if all of the spent gases had been purged. Subsequently, as the piston again rises on a compression stroke, the engine is generally designed so that the top of the piston head closely approaches the top of the cylinder, as was necessary to accomplish satisfactory purging on the exhaust stroke. This results in a high ratio of compression along with several disadvantages attendant thereto. Increased requirements for a higher premium grade of fuel and for a heavier engine frame are two results necessitated by high ratios of compression, as will be well understood by those familiar with the art. Features of the present invention provide for substantially complete purging of the cylinder during the exhaust stroke and immediate intake of the fuel charge during the intake stroke without the necessity of a high compression ratio and the disadvantages attendant thereto. This invention provides for a combustion chamber positioned intermediate the cylinder and the exhaust passageway having a port opening into the cylinder and another port opening into the exhaust passageway. A valve seat is formed at each port of the combustion chamber. The head of the exhaust valve is positioned within the combustion chamber and is slidably carried to alternately engage in seating relation the valve seats at each port of the combustion chamber. When the exhaust valve opens, therefore, it does not extend into the cylinder. Also, during the compression and power strokes the volume of the cylinder is effectively increased by that of the combustion chamber to reduce the ratios of compression.

Thus, when the piston is rising to the top of the cylinder on the exhaust stroke, the head of the exhaust valve is in an open position above the top of the cylinder, thereby permitting the top of the piston to very closely approach the top of the cylinder and substantially completely purge the cylinder. After the piston reaches approximately top dead center on the exhaust stroke, the head of the exhaust valve then seats at the lower port of the combustion chamber, thereby effectively isolating the combustion chamber from the cylinder. Subsequently, as the piston descends on the intake strokes the intake valve can open immediately upon the piston moving beyond the position of the intake valve head in an open or extended position. Thus, essentially a complete fuel charge can be introduced into the cylinder.

After the piston reaches bottom dead center at the end of the intake stroke, the exhaust valve rises rapidly to seat the exhaust valve head on the valve seat at the upper port of the combustion chamber, thereby isolating the exhaust passageway from the combustion chamber and effectively adding the volume of the combustion chamber to that of the cylinder. Therefore, as the piston rises to top dead center on the compression stroke, the additional volume of the combustion chamber added to that of the cylinder results in a relatively low ratio of compression, even though the piston has essentially risen to the very top of the cylinder. Means are provided in the combustion chamber to ignite the fuel charge and the disadvantages of a high ratio of compression during ignition are also alleviated.

Therefore, the objects of the invention are to provide a simple, effective means of reducing the ratios of compression; to provide means of purging the cylinder of substantially all spent gases during the exhaust stroke; to provide means to withdraw the valve head of the exhaust valve away from the top of the cylinder during the exhaust stroke, thereby permitting the top of the piston to travel to the top of the cylinder during the exhaust stroke; to provide means for alleviating a pressure build-up of spent gases at the end of the exhaust stroke; to provide means for early intake of the fuel charge as soon as the piston clears the extended position of the head of the intake valves; to provide means to effectively increase the volume of the cylinder during the compression stroke; to provide means whereby the construction of internal combustion engines is improved so as to effect simplicity, durability and high efficiency; to provide means whereby the engine is relatively compact and capable of using a lighter frame; to provide means to effectively accommodate a lower grade of fuel; to provide means to greatly effect efficiency at higher revolutions per minute; and to provide means to effect great economies of operation.

Other objects and further advantages will be fully apparent from a description of the accompanying drawings. Although minor modifications might be suggested by those versed in the art, it should be understood that I wish to embody within the scope of the patent warranted hereon all such modifications as reasonably come within the scope of my contribution to the art.

On the drawings:

FIGURE 2 is a fragmentary elevational sectional view of the engine of FIGURE 1 showing the positions of the valves during the initial stages of the compression strokes;

FIGURE 3 is the same as FIGURE 2 showing the positions of the valves during the final stages of the compression strokes;

FIGURE 4 is the same as FIGURE 2 showing the positions of the valves during the initial stages of the power stroke;

FIGURE 5 is the same as FIGURE 2 showing the positions of the valves during the initial stages of the exhaust stroke;

FIGURE 6 is the same as FIGURE 2 showing the positions of the valves during the final stages of the exhaust stroke; and FIGURE 7 is a fragmentary elevational sectional view showing a modified form of the valve assembly.

As shown on the drawings:

Figure 1:
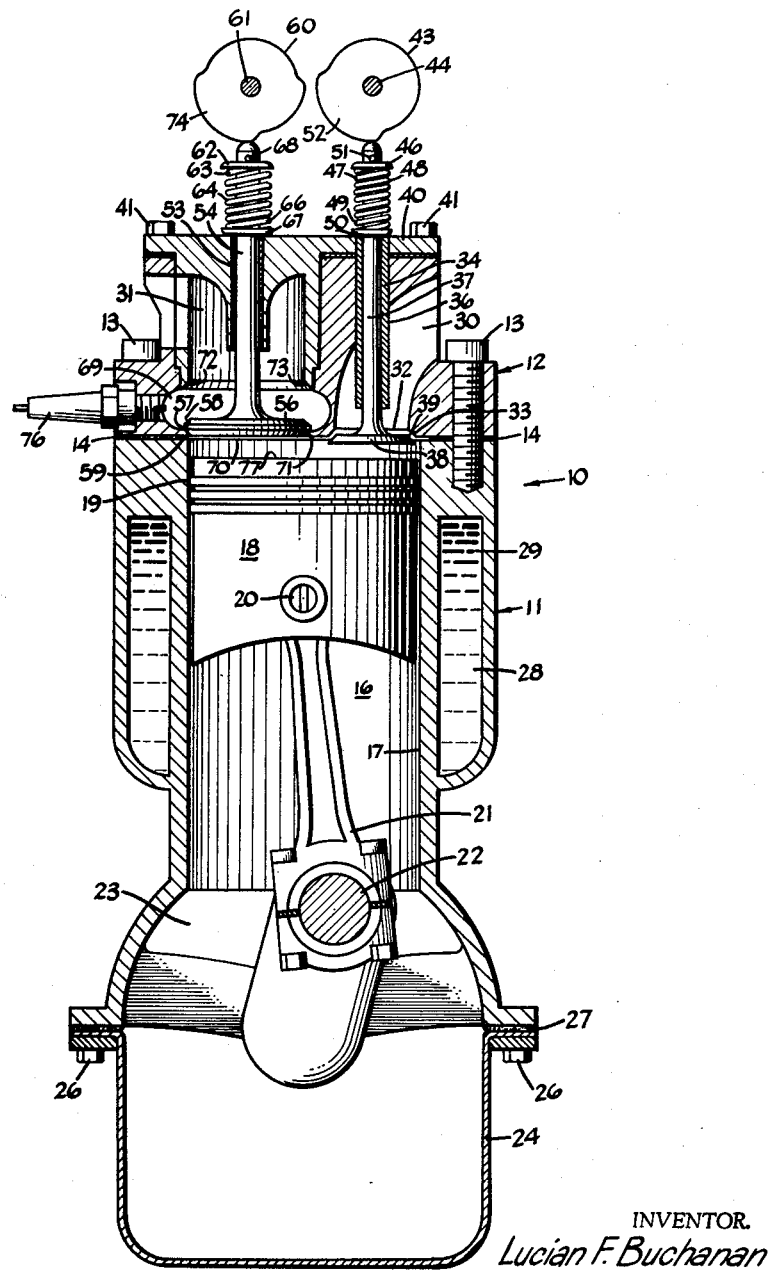
FIGURE 1 is an elevational sectional view of an internal combustion engine with parts removed, showing the position of the valves during the initial stages of the intake stroke.

Referring now to the drawings wherein like reference numerals are used throughout to designate like parts in the various figures thereof, and more particularly to FIGURE 1, reference numeral 10 designates generally an internal combustion engine body embodying the principles of the present invention and having an engine block generally designated by the numeral 11 and an engine head generally designated by numeral 12. The engine head is conveniently secured to the block by means of the head bolts 13, the head being separated from the block by the head gasket 14.

The engine block has a cylinder 16 formed therein having a cylinder wall 17 for engagement with a piston 18. The piston carries piston rings 19 and is pivotally connected by means of a wrist pin 20 to a connecting rod 21. The connecting rod is pivotally connected to a crankshaft 22 which is journalled in an engine block crankcase 23. The crankcase is closed at the bottom by an oil pan 24 which is secured to the bottom of the engine block by bolts 26 and separated from the engine block by a gasket 27. When water is used as the engine coolant it is common to form cavities or water jackets 28 in the engine block through which is pumped a coolant as shown at 29.

The engine head is formed to provide a hollow intake passageway 30 and a hollow exhaust passageway 31.

The intake passageway leads from an intake manifold (not shown) to an intake port 32 which opens to the top of the cylinder 16. The engine head is formed to provide a valve seat 33 at the intake port 32. A bore 34 having a longitudinal axis substantially parallel to the longitudinal axis of the cylinder 16 is formed in the engine head. A cylindrical valve guide 36 is inserted in the bore 34 and slidably carries a poppet-type intake valve 37. The intake valve extends through the valve guide 36 and has an enlarged portion or valve head 38 with a tapered or chamfered end 39. The tapered end 39 is shaped to cooperate with and seat on the valve seat 33. An upper portion 40 of the engine head is secured to the main portion of the engine head by means of bolts 41. The valve guide 36 extends to the top of the upper portion of the engine head and the intake valve 37 extends therethrough to engage a cam 43. The cam 43 is securely mounted on a camshaft 44 and rotates to move the valve 37 downwardly. Suitable means (not shown) are provided for connecting the camshaft 44 with the crankshaft 22 for the purpose of rotating the camshaft.

Received in an upper spring retainer 46 is an upper end 47 of a coil spring 48 which surrounds the valve 37 and which has a lower end 49 received in a lower spring retainer 50. The lower retainer abuts the top surface of the engine head and the upper retainer is restrained by a boss 51 formed on the valve 37. Therefore, when an offset 52 of the cam 43 rotates to move the valve 37 downwardly to unseat the valve head 38 from the valve seat 33, the spring 46, upon further rotation of the cam urges the valve upwardly to again seat the valve head in the valve seat 33 and isolate the cylinder 16 from the intake passageway 30.

Also carried by the engine head is an exhaust valve guide 53 through which extends a poppet-type exhaust valve 54 having an enlarged portion or valve head 56. An end portion 57 of the valve head is beveled at an upper surface 58 and a lower surface 59. A cam 60 is securely mounted on a camshaft 61 and rotates to move the valve 54 downwardly. Suitable means (not shown) are provided for connecting the camshaft 61 with the crankshaft 22 for the purpose of rotating the camshaft. Received in an upper spring retainer 62 is an upper end 63 of a coil spring 64 which surrounds the valve 54 and which has a lower end 66 received in a lower spring retainer 67. The lower retainer abuts the top surface of the engine head and the upper retainer is restrained by a boss 68 formed on the valve 54.

The lower portion of the exhaust passageway 31 forms an enlarged hollow combustion chamber 69. At the bottom portion of the combustion chamber is formed a port 70 which opens into the cylinder 16 and which forms a valve seat 71. At the top portion of the combustion chamber is formed a port 72 which opens into the upper portion of the exhaust passageway and which forms a valve seat 73. The taper or bevel 58 of the upper portion of the valve head 56 and the valve seat 73 are shaped complementarily, as well as the taper 59 of the lower portion of the valve head 56 and the valve seat 71. Therefore, when an offset 74 of the cam 60 rotates to move the valve 54 downwardly the valve head 56 unseats from the valve seat 73 and seats on the valve seat 71, thereby closing port 70 and isolating the cylinder 16 from the combustion chamber 69. Upon further rotation of the cam 60 the spring 64 urges the valve upwardly to unseat the valve head 56 from the valve seat 71 and then seat the valve head on the valve seat 73, thereby closing port 72 and isolating the upper portion of the exhaust passageway 31 from the combustion chamber 69. The side wall 65 of the combustion chamber as illustrated has an enlarged middle section between the constricted ends to facilitate gaseous flow around the valve head 56.

A spark plug 76 is shown mounted in the engine head and protruding into the combustion chamber 69. Suitable means (not shown) are provided for energizing the spark plug in timed relation to the rotation of the crankshaft 22, thereby initiating combustion of a fuel charge. It will be understood that means other than a spark plug can be provided for accomplishing this initation of combustion of the fuel charge.

Referring again to FIGURE 1, the crankshaft 22 is shown as having rotated in a clockwise direction slightly beyond a top dead center position. A top surface 77 of the piston 18 has moved downwardly from the top of the cylinder 16 and the intake valve head 38 has also moved downwardly from the valve seat 33 into the cylinder 16, thereby opening the intake port 32 to the cylinder. The valve head 56 of the exhaust valve 54 is seated on the valve seat 71 thereby isolating the combustion chamber 69 from the cylinder 16. As the piston moves downwardly on its intake stroke, a charge of fuel will thereby be drawn into the cylinder 16 through the intake passageway 30. Referring to FIGURE 2, the crankshaft 22 is shown as having continued its clockwise rotation from its position illustrated in FIGURE 1 and is shown slightly beyond a bottom dead center position. At this point in the crankshaft rotation the cam 43 and the spring 48 operate to close or seat the intake valve 37 and contemporaneously the cam 60 and spring 64 operate to unseat the exhaust valve head 56 from the valve seat 71 at the bottom portion of the combustion chamber 69. The configuration of the cam 60 is such that the valve head 56 unseats rapidly from the valve seat 71 and moves rapidly with little further rotation of the crankshaft to seating engagement with the valve seat 73 at the upper portion of the combustion chamber 69. It will be understood by those skilled in the art that the rapid unseating of the exhaust valve head from the valve seat at the lower portion of the combustion chamber and subsequent rapid seating at the upper portion of the combustion chamber will allow little or no fuel charge to escape through the exhaust passage 31 since the crankshaft has just passed its bottom dead center position and the pressure of the fuel charge in the cylinder closely approximates the pressure which exists in the exhaust passageway at this position of the crankshaft.

FIGURE 3 illustrates the crankshaft 22 in a position appproaching top dead center on its compression stroke. The intake valve head 38 is seated on the valve seat 33 and the exhaust valve head is seated on the valve seat 73 at the upper portion of the combustion chamber. It will be understood that the top surface 77 of the piston 18 can move upwardly during the compression stroke to essentially the top of the cylinder 16 without creating an unduly high pressure on the fuel charge in the cylinder since the combustion chamber 69 is now open to the cylinder and the volume of the combustion chamber is effectively added to that of the cylinder above the piston. The ratios of compression contemplated in this invention range from 7:1 to 8:1, although it is understood that a variation in the size of the combustion chamber will effectively vary the ratios of compression obtainable.

Referring to FIGURE 4, the crankshaft 22 is shown as having continued its clockwise rotation from its position illustrated in FIGURE 3 and is beyond top dead center on its power stroke. The spark plug 76 extending into the combustion chamber 69 has fired, thereby initiating combustion of the fuel charge therein and forcing the piston 18 in a downwardly direction. The valve head 56 of the exhaust valve continues to be seated on the valve seat 73, thereby isolating the upper portion of the exhaust passageway 31 from the combustion chamber, and the valve head 38 of the intake valve continues to be seated on the valve seat 33, thereby closing the intake port 32.

Referring now to FIGURE 5, the crankshaft 22 is shown as having continued its clockwise rotation from its position illustrated in FIGURE 4, thereby completing its power stroke, and is now in a position slightly beyond bottom dead center on its exhaust stroke. At this point in the position of the crankshaft, the cam 60 and spring 64 operate to unseat the valve head 56 of the exhaust valve from its seating engagement with the valve seat 73, thereby opening the combustion chamber 69 to the exhaust passageway 31 and providing communication for spent gases from the cylinder 16 to the upper portion of the exhaust passageway 31. The configuration of the offset 74 of the cam 60 is such as to provide a relatively long dwell of the valve head 56 in an unseated position as the crankshaft 22 continues its exhaust stroke.

Referring to FIGURE 6, the crank shaft is shown as having continued its rotation from its position illustrated in FIGURE 5 and is shown approaching its top dead center position terminating the exhaust stroke. The valve head 56 is proximately spaced from the valve seat 71 and it is to be understood that the seating engagement of the valve head 56 to the valve seat 71 occurs contemporaneously with the approach of the crankshaft to its top dead center position. Since the valve head 56 seats above the top of the cylinder 16, the piston 18 can move upwardly to the top of the cylinder 16 without interference with the exhaust valve head, thereby ensuring substantially complete purging of the cylinder during the exhaust stroke.

From the position illustrated in FIGURE 6, the crankshaft 22 continues rotation to its position shown in FIGURE 1, whereby the crankshaft has continued beyond the top dead center position only sufficiently so that the top surface 77 of the piston 18 has moved downwardly for enough to be below the position of the valve head 38 of the intake valve 37 in its open position. Since the cylinder 16 has essentially been completely purged of spent gases during the exhaust stroke, and the pressure which exists in the cylinder upon termination of the exhaust stroke is essentially equal to atmospheric pressure, the early opening of the intake valve 38 will not cause spent gases to move into the intake passageway 30. Instead, since the cylinder is completely purged and at atmospheric pressure upon completion of the exhaust stroke, the intake valve is opened as soon as the piston has cleared the open position of the intake valve, thereby providing for a complete fuel charge to be drawn into the cylinder during the intake stroke.

Referring to FIGURE 7, a second embodiment of the present invention is illustrated wherein the gas engine essentially as illustrated in FIGURE 1 has a modified engine head 78. An intake passageway 79 is formed within the engine head 78 and is partially defined by walls 80 and 81. The lower portions of the walls 80 and 81 are mutually inwardly biased to form imperforate depending walls 82 and 83 which terminate at cylindrically shaped side walls 84 and 86. Carried within the side walls 84 and 86, which serve as a valve guide, is an exhaust valve 87 having a centrally apertured enlarged portion or valve head 88. In order to prevent passage of gases between the guide walls 84 and 86 and the exhaust valve 87 and exhaust valve elementary or ring 89 is inserted into a groove 90 formed circumferentially in a side wall 91 of the exhaust valve 87. At an upper portion 92 of the exhaust valve a hollow cylindrically shaped intake valve guide 93 is extended downwardly therefrom. A substantially cylindrically shaped inner chamber or cavity 94 is formed between the side wall 91 and the valve guide 93 and is in constant communication with the intake passageway 79 through openings or canals 96 formed near the upper portion of the side wall 91.

The centrally apertured valve head 88 resides within a combustion chamber 97 and has upper and lower surfaces 98 and 99 beveled or tapered as at 100 and 101 and shaped complementarily to engage respectively in seating relation a valve seat 102, which forms a port at the upper end of the combustion chamber 97, and a valve seat 103, which forms a port at the lower end of the combustion chamber. The central aperture of the valve head 88 forms a cylindrically shaped tapered valve seat 104.

Residing slidably within the valve guide 93 is a cylindrically shaped valve stem 106 of an intake valve 107. The lower portion of the intake valve forms a valve head 108 having a tapered end 109 shaped complementarily to the valve seat 104 of the exhaust valve head 88.

Centrally located in a top surface 110 of the engine head 78 is a cylindrically formed intake valve stem sleeve 111, through which extends the valve stem 106. A coil spring 112 surrounds the protruding portion of the valve stem. A spring retainer 113 is firmly affixed to the upper portion of the valve stem 106 and receives an upper end 114 of the coil spring 112. A lower end 116 of the coil spring abuts the top surface 110 of the engine head. The upper portion 92 of the exhaust valve forms a shoulder for a lower end 117 of a second coil spring 118. An upper end 119 of the coil spring 118 is received by a spring retainer 120 which is firmly affixed to an intermediate portion of the valve stem 106. A cam (not shown) slidably engages an upper end 121 of the valve stem 106 to move the intake valve and exhaust valve downwardly in timed relation to rotation of the crankshaft 22.

An exhaust passageway 115 is formed exteriorly of the exhaust valve 87 and is partially defined by the outward side of the exhaust valve side wall 91 and an engine head inner wall 122. The upper portion of the exhaust passageway opens into the combustion chamber through the port formed by the valve seat 102 and is in constant communication with an exhaust manifold (not shown) through an opening 123 formed in a wall 124 of the engine head 78. A wall 126 of the engine head forms an indent 127 which circumferentially surrounds the exhaust passageway and is in direct communication with the opening 123, thereby assuring a substantially unrestricted flow of spent gases from the combustion chamber to the exhaust manifold.

The embodiment of the present invention illustrated in FIGURE 7 utilizes the same inventive concept as that illustrated in FIGURE 1. Referring to FIGURE 7, and assuming that the crankshaft 22 is in a top dead center position following an exhaust stroke of the piston 18, as the crankshaft continues to rotate clockwise from its top dead center position the cam (not shown) which engages the upper end 121 of the intake valve stem 106 depresses the intake valve 107 contemporaneously with the downward movement of the piston 18 below the position of the intake valve head 108 in an open position. The valve head 88 of the exhaust valve 87, abutting the valve seat 103 at the lower end of the combustion chamber 97 is prevented from moving downwardly. As the crankshaft 22 continues its clockwise rotation on the intake stroke with the intake valve head 108 in an open position a fuel charge is drawn into the cylinder 16 from the inner chamber 94 of the exhaust valve which communicates with the intake passageway 79 through the canals 96. As the crankshaft reaches its bottom dead center position upon completion of the intake stroke, the cam (not shown) and the coil spring 112 operate to close or seat the intake valve head 108 on the valve seat 104. As the crankshaft continues its clockwise rotation beyond bottom dead center on a compression stroke the cam (not shown) and the coil spring 112 operate to raise the intake valve, and consequently the exhaust valve, until the tapered upper surface 100 of the exhaust valve head 88 engages the valve seat 102 at the upper port of the combustion chamber 97, thereby isolating the combustion chamber from the upper portion of the exhaust passageway 115. As the crankshaft continues its rotation to a top dead center position on the compression stroke, the volume of the combustion chamber 97 is effectively added to the volume of the cylinder 16 above the piston 18 to effectively reduce the pressure of the compressed fuel charge and, accordingly, the ratio of compression. Contemporaneously with the reaching of the top dead center position by the crankshaft 22, suitable means (not shown) are utilized to energize the spark plug 76, thereby initiating combustion of the fuel charge in the combustion chamber and thereby forcing the piston 18 downwardly on a power stroke.

After the crankshaft reaches its bottom dead center position upon termination of the power stroke, and as it continues its rotation during the early stages of the exhaust stroke, the cam (not shown) and the coil spring 112 operate to move the intake valve downwardly which results in unseating the upper surface 100 of the exhaust valve head 88 from the valve seat 102 while the intake valve head 108 remains seated on the valve seat 104 of the exhaust valve head 88. The configuration of the operating cam is shaped such that the exhaust valve head 88 will dwell intermediate the valve seats 102 and 103 during substantially the entire exhaust stroke of the crankshaft 22. Contemporaneously with the termination of the exhaust stroke and the attainment of a top dead center position by the crankshaft 22 the operating cam (not shown) will move the upper end 121 of the intake valve stem 106 downwardly until the lower tapered surface 101 of the exhaust valve head 88 engages in seating relation the valve seat 103 at the lower port of the combustion chamber 97, thereby isolating the cylinder 16 from the combustion chamber.

The embodiment of FIGURE 7, therefore, utilizes the same inventive concept as the embodiment illustrated in FIGURE 1, but requires only one operating cam, provides for a larger diametered port between the combustion chamber and the cylinder and therefore requires less travel of the exhaust valve head as it alternately moves from the valve seat 103 at the lower port of the combustion chamber 97 to the valve seat 102 at the upper port of the combustion chamber.

The advantages of the present invention apply whether the combustible fuel mixture is received from a carburetor or the fuel is injected to be admixed with air within the engine.

Although minor modifications might be suggested by those versed in the art, it should be understood that I wish to embody within the scope of the patent warranted hereon all such modifications as reasonably come within the scope of my contribution to the art.

I claim as my invention:

1. An internal combustion engine including
an engine block having a cylinder with a piston slidably carried therein,
an engine head having an intake passageway and an exhaust passageway formed therein,
    said exhaust passageway having an upper portion and a lower portion forming a combustion chamber,
    said combustion chamber having a top port opening into said upper portion of said exhaust passageway and a bottom port opening into said cylinder,
intake and exhaust valves slidably carried in said engine head,
    said exhaust valve having a valve head residing within said combustion chamber, and said valve head being movable from said top port whereby said upper portion of said exhaust passageway is isolated from said combustion chamber to said bottom port whereby said combustion chamber is isolated from said cylinder.

2. An internal combustion engine including
an engine block having a cylinder with a piston slidably carried therein,
an engine head having an intake passageway and an exhaust passageway formed therein,
    said exhaust passageway having an upper portion and lower portion forming a combustion chamber,
    said combustion chamber having a top port opening into said upper portion of said exhaust passageway and a bottom port opening into said cylinders,
poppet-type intake and exhaust valves slidably carried in said engine head,
    said exhaust valve extending into said exhaust passageway and having a valve head residing within said combustion chamber, and said valve head being movable from said top port whereby said upper portion of said exhaust passageway is isolated from said combustion chamber to said bottom port whereby said combustion chamber is isolated from said cylinder.

3. An internal combustion engine including
an engine block having a cylinder with a longtiudinal axis,
a piston slidably carried within said cylinder, an engine head having an intake passageway and an exhaust passageway formed therein,
    said exhaust passageway having an upper portion and a lower portion forming a combustion chamber,
    said combustion chamber having a top port opening into said upper portion of said exhaust passageway and a bottom port opening into said cylinder,
a valve seat formed at said top port and said bottom port,
poppet-type intake and exhaust valves having a longitudinal axis slidably carried in said engine head,
    said exhaust valve extending into said exhaust passageway and having a valve head residing within said combustion chamber,
    said valve head being movable from said valve seat at said top port whereby said upper portion of said exhaust passageway is isolated from said combustion chamber to said valve seat at said bottom port whereby said combustion chamber is isolated from said cylinder, and said longitudinal axes of said valves and said cylinder being in parallel relation.

4. An internal combustion engine including an engine block having a cylinder with a piston slidably carried therein, an engine head having an intake passageway and an exhaust passageway formed therein, said exhaust passageway having an upper portion and a lower portion forming a combustion chamber, said combustion chamber having a top port opening into said upper portion of said exhaust passageway and a bottom port opening into said cylinder, a valve seat formed at said top port and at said bottom port, combustion initiating means mounted in said engine and extending into said combustion chamber, poppet-type intake and exhaust valves slidably carried in said engine head, said exhaust valve having a valve head residing within said combustion chamber, said valve head being alternately movable from said valve seat at said top port whereby said upper portion of said exhaust passageway is isolated from said combustion chamber to said valve seat at said bottom port whereby said combustion chamber is isolated from said cylinder.

5. An internal combustion engine including an engine block having a cylinder formed therein, a piston slidably carried in said cylinder, an engine head mounted on said block and having an intake passageway and an exhaust passageway formed therein, said exhaust passageway having an upper portion and a lower portion forming a combustion chamber, said combustion chamber having a pair of restricted ends and an enlarged portion, a valve seat formed at one of said restricted ends and forming a port opening into said upper portion of said exhaust passageway, a valve seat formed at the other of said restricted ends and forming a port opening into said cylinder, and intake and exhaust valves slidably carried in said engine head, said exhaust valve having a valve head positioned within said combustion chamber and having a first position whereby said valve head is in seating engagement with said valve seat at said one end of said combustion chamber thereby isolating said combustion chamber from said upper portion of said exhaust passageway and a second position whereby said valve head is in seating engagement with said valve seat at said other end of said combustion chamber thereby isolating said combustion chamber from said cylinder.

6. An internal combustion engine including an engine block having a cylinder formed therein, a piston slidably carried in said cylinder, an engine head mounted on said block and having an intake passageway and an exhaust passageway formed therein, said exhaust passageway having an upper portion and a lower portion forming a combustion chamber, said combustion chamber having a pair of restricted ends and an enlarged portion, combustion initiating means mounted in said engine and extending into said enlarged portion of said combustion chamber, a valve seat formed at one of said restricted ends and forming a port opening into said upper portion of said exhaust passageway, a valve seat formed at the other of said restricted ends and forming a port opening into said cylinder, poppet-type intake and exhaust valves slidably carried in said engine head, said exhaust valve having a valve head positioned within said combustion chamber and having a top surface shaped complementarily to said valve seat at said one end of said combustion chamber and a lower surface shaped complementarily to said valve seat at said other end of said combustion chamber, and said valve head having a first position whereby said top surface is in seating engagement with said valve seat at said one end of said combustion chamber thereby isolating said combustion chamber from said upper portion of said exhaust passageway and a second position whereby said lower surface is in seating engagement with said valve seat at said other end of said combustion chamber thereby isolating said combustion chamber from said cylinder.

7. An internal combustion engine including an engine block having a cylinder formed therein, a piston carried within said cylinder and reciprocally movable to accomplish an intake stroke and a compression stroke and a power stroke and an exhaust stroke, an engine head mounted on said block and having an intake passageway and an exhaust passageway formed therein, said exhaust passageway having an upper portion and a lower portion forming a combustion chamber, said combustion chamber having a top port opening into said upper portion of said exhaust passageway and a bottom port opening into said cylinder, a valve seat formed at each of said ports, intake and exhaust valves movably carried in said engine head, said exhaust valve having a valve head positioned within said combustion chamber, means responsive to said movement of said piston for moving said valve head into seating engagement with said valve seat at said top port of said combustion chamber during the early stages of the compression stroke of said piston to isolate said combustion chamber from said upper portion of said exhaust passageway, and means responsive to said movement of said piston for moving said valve head into seating engagement with said valve seat at said bottom port of said combustion chamber during substantially the entire exhaust stroke of said piston to isolate said combustion chamber from said cylinder, whereby said valve head in movably positioned intermediate said ports of said combustion chamber during substantially the entire exhaust stroke of said piston.

8. An internal combustion engine including, an engine block having a cylinder formed therein, a piston carried within said cylinder and reciprocally movable to accomplish an intake stroke and a compression stroke and a power stroke and exhaust stroke, an engine head mounted on said block and having an intake passageway and an exhaust passageway formed therein, said exhaust passageway having an upper portion and a lower portion forming a combustion chamber, said combustion chamber having a restricted top port opening into said upper portion of said exhaust passageway and a restricted bottom port opening into said cylinder and an enlarged portion, a valve seat formed at each of said ports, poppet-type intake and exhaust valves movably carried in said engine head, said exhaust valve having a valve head positioned within said combustion chamber and having upper and lower surfaces shaped complementarily to said valve seats at said top and bottom port respectively of said combustion chamber, means responsive to said movement of said piston for moving said upper surface of said valve head into seating engagement with said valve seat at said top port of said combustion chamber during the early stages of the compression stroke of said piston to isolate said combustion chamber from said upper portion of said exhaust passageway, means responsive to said movement of said piston for moving said lower surface of said valve head into seating engagement with said valve seat at said bottom port of said combustion chamber during substantially the entire exhaust stroke of said piston to isolate said combustion chamber from said cylinder, and combustion initiating means mounted in said engine head and extending into said larger portion of said combustion chamber, whereby said valve head is movably positioned intermediate said ports of said combustion chamber during substantially the entire exhaust stroke of said piston.

9. An internal combustion engine including, an engine block having a cylinder formed therein, a piston carried within said cylinder and reciprocally movable to accomplish an intake stroke and a compression stroke and a power stroke and an exhaust stroke, an engine head mounted on said block and having an intake passageway and an exhaust passageway formed therein, said exhaust passageway having an upper portion and a lower portion forming a combustion chamber, said combustion chamber having a top port opening into said upper portion of said exhaust passageway and a bottom port opening into said cylinder, a valve seat formed at each of said ports, poppet-type intake and exhaust valves movably carried in said engine head, said exhaust valve having a valve head positioned within said combustion chamber, means responsive to said movement of said piston for serially maintaining said valve head in seating engagement with said valve seat at said bottom port of said combustion chamber during the intake stroke of said piston and thence moving said valve head from said bottom port into seating engagement with said valve seat at said top port of said combustion chamber during the early stages of the compression stroke of said piston and thence maintaining said valve head in seating engagement with said valve seat at said top port of said combustion chamber during the power stroke of said piston and thence moving said valve head from said top port into seating engagement with said valve seat at said bottom port of said combustion chamber during substantially the entire exhaust stroke of said piston, and combustion initiating means mounted in said engine and extending into said combustion chamber.

10. An internal combustion engine including, an engine body having a cylinder formed therein, intake and exhaust passageways formed within said body, a combustion chamber, first and second ports communicating said combustion chamber with said cylinder and said exhaust passageway, respectively, and through which exhaust gases flow from said cylinder to said exhaust passageway, an exhaust valve slidably carried within said body, said exhaust valve having a single valve head which is alternately cooperable with said first and second ports to control gaseous flow therethrough, and a piston carried within said cylinder and reciprocally movable therein for withdrawing gases from said intake passageway and expelling them through said exhaust passageway.

11. The internal combustion engine as defined in claim 10, and further including an inner chamber formed within said exhaust valve in constant open communication with said intake passageway and opening to said cylinder, and valve means within said inner chamber for controlling gaseous flow therethrough.

12. An internal combustion engine including, an engine body having a cylinder formed therein, intake and exhaust passageways formed within said body, a combustion chamber, first and second valve seats formed in said combustion chamber and defining, respectively, first and second ports communicating said combustion chamber with said cylinder and said exhaust passageway and through which exhaust gases flow from said cylinder to said exhaust passageway, an exhaust valve having an inner chamber formed therein and slidably carried within said body, said exhaust valve having a single apertured valve head positioned within said combustion chamber and alternately cooperable with said first and second ports to control gaseous flow through said ports, a valve seat formed at said aperture of said valve head, said exhaust valve having an upper portion having an apertured valve guide, said upper portion of said exhaust valve forming an intake canal therethrough communicating said intake passageway with said inner chamber, an intake valve slidably carried in said valve guide of said exhaust valve, said intake valve having a valve head positioned adjacent said inner chamber of said exhaust valve and shaped complementarily to said valve seat at said aperture of said exhaust valve head, and a piston carried within said cylinder and reciprocally movable therein for withdrawing gases from said intake passageway and expelling them through said exhaust passageway.

13. The internal combustion engine as defined in claim 12 in which said piston is movable to accomplish an intake stroke, a compression stroke, a power stroke and an exhaust stroke, and further including, means responsive to said movement of said piston for serially maintaining said valve head of said exhaust valve in seating engagement with said first valve seat of said combustion chamber and unseating said valve head of said intake valve from said valve seat at said aperture of said exhaust valve during said intake stroke of said piston and thence moving said valve head of said intake valve into seating engagement with said valve seat at said aperture of said exhaust valve head and contemporaneously moving said valve head of said exhaust valve from seating engagement with said first valve seat of said combustion chamber into seating engagement with said second valve seat of said combustion chamber during said compression stroke of said piston and thence for maintaining said valve head of said intake valve in seating engagement with said valve seat at said aperture of said exhaust valve head and maintaining said valve head of said exhaust valve in seating engagement with said second valve seat of said combustion chamber during said power stroke of said piston and thence for maintaining said valve head of said intake valve in seating engagement with said valve seat at said aperture of said exhaust valve head and moving said valve head of said exhaust valve from seating engagement with said second valve seat of said combustion chamber into seating engagement with said first valve seat of said combustion chamber during said exhaust stroke of said piston.

14. In an internal combustion engine,
a cylinder formed in said engine and having a piston slidably carried therein,
an exhaust passageway formed in said engine and in communication with said cylinder for conveying exhaust gases from said cylinder,
first and second spaced valve seats formed in said exhaust passageway and defining respectively first and second exhaust ports through which the exhaust gases pass, and
an exhaust valve carried in said engine and having a valve head situated within said exhaust passageway between said first and second valve seats,
said valve head being movable from said first valve seat whereby said exhaust passageway is isolated from said cylinder to said second valve seat whereby a portion of said exhaust passageway is isolated from said engine.

15. In an internal combustion engine,
a cylinder formed in said engine and having a piston slidably carried therein for reciprocal movement through an intake stroke, a compression stroke, a power stroke, and an exhaust stroke,
an exhaust passageway formed in said engine and in communication with said cylinder for conveying exhaust gases from said cylinder,
first and second spaced valve seats formed in said exhaust passageway and defining respectively first and second exhaust ports through which the exhaust gases pass and further forming a combustion chamber therebetween,
an exhaust valve carried in said engine and having a valve head situated in said combustion chamber,
said valve head being movable from said first valve seat whereby said combustion chamber is isolated from said cylinder to said second valve seat whereby said combustion chamber is in communication with said cylinder, and
valve actuating means operatively connected to said exhaust valve and responsive to movement of said piston to seat said valve head on said first valve seat during substantially most of the intake stroke, to seat said valve head on said second valve seat during substantially most of the compression and power strokes, and to maintain said valve head between said first and said second valve seats during substantially most of said exhaust stroke.

References Cited in the file of this patent
UNITED STATES PATENTS

| | | |
|---|---|---|
| 811,809 | Williams | Feb. 6, 1906 |
| 1,622,010 | Summer | Mar. 22, 1927 |
| 2,032,542 | Mantle | Mar. 3, 1936 |
| 2,246,998 | Leonard | June 24, 1941 |